United States Patent [19]
Jensen

[11] Patent Number: 5,906,031
[45] Date of Patent: May 25, 1999

[54] ROTATING AND LOCKING CLIP FOR PORTABLE ELECTRONIC DEVICE

[75] Inventor: Tyler D. Jensen, San Diego, Calif.

[73] Assignee: Hughes Electronics Corporation, El Segundo, Calif.

[21] Appl. No.: 09/062,631

[22] Filed: Apr. 17, 1998

[51] Int. Cl.[6] .............................. A44B 21/00; A45F 5/00
[52] U.S. Cl. .............................. 24/3.12; 24/3.11; 24/597; 24/590
[58] Field of Search .................................... 24/3.12, 3.11, 24/3.1, 590, 597, 663

[56] References Cited

U.S. PATENT DOCUMENTS

| | | | |
|---|---|---|---|
| 4,605,335 | 8/1986 | Otrusina | 24/3.12 |
| 4,903,375 | 2/1990 | DiFranco | 24/3.12 |
| 5,054,170 | 10/1991 | Otrusina | 24/597 |
| 5,331,721 | 7/1994 | Raum, Sr. | 24/3.12 |
| 5,347,693 | 9/1994 | Otrusina | 24/3.12 |
| 5,452,497 | 9/1995 | Peng | 24/3.11 |
| 5,730,342 | 3/1998 | Tien | 24/3.12 |
| 5,806,146 | 9/1998 | Chen | 24/3.12 |

Primary Examiner—Victor N. Sakran
Attorney, Agent, or Firm—John T. Whelan; Michael W. Sales

[57] ABSTRACT

The present invention is a locking belt attachment assembly for an electronics device that allows the electronic device to be attached to a person's belt and that locks the electronic device into a vertical position, thus preventing rotation while the electronic device is on the person's belt. In an embodiment, the locking belt attachment assembly employs two pieces: a clip and a cleat. An attachment post on the cleat is designed to be selectively inserted into a slot on the belt clip, but once fully inserted into the slot, the attachment post may rotate. For the attachment post to be insertable in the slot, the electronic device is rotated to a 90 degree angle from the clip, positioning the attachment post in an insertable position relative to the slot. Once the attachment post is fully inserted into the slot, the electronic device is rotated 90 degrees to vertical and a snap lock feature on the belt clip interfaces with a snap lock mating feature on the cleat, locking the electronic device into its vertical position. To remove the electronic device, a rotating force is applied that disengages the snap lock feature and the electronic device is rotated 90 degrees to a horizontal position and the attachment post is removed from the slot, releasing the cleat from the clip.

13 Claims, 5 Drawing Sheets

ROTATING AND LOCKING CLIP FOR PORTABLE ELECTRONIC DEVICE

BACKGROUND OF THE INVENTION

The present invention relates to an attachment assembly used to detachably attach a portable electronic device, and more particularly a belt attachment assembly for detachably attaching a portable transceiver to a user's belt in a vertical position.

In the last few decades, the electronics industry has literally transformed the world. Portable electronic products are used by, or affect the daily lives of, a large segment of the world's population. For example, radios, cellular phones, wireless phones, pagers, and video camcorders, are just a few of the electronic products that have been developed in recent years that have been made smaller and more portable.

Some of these portable electronic devices are carried on a person so that they are immediately available when needed. These electronic devices can be carried in carrying cases, which themselves must be supported by the person. Other methods of carrying the electronic devices include large shoulder bags, small pouches, straps, clips and the like.

With respect to items such as phones or radios, such items should preferably be easily and quickly attachable and detachable from the person, most commonly the waist belt, so that when an incoming communication is received, and a response needs to be made, the electronic device can be quickly and easily removed for operation. As with all approaches to carrying an electronic device, the detachable connection between the case and the belt should be comfortable to the wearer.

Further, some electronic device have a preferred operating orientation when they are carried by the person. For example, a preferred method for carrying an elongated item, such as a radio with an antenna, is with the antenna pointed up. Detachable connection devices currently on the market are pivotal or swivel-type attachment devices that allow the electronic device to swing in any direction about an axes as the user moves about. At times this can result in the electronic device becoming inverted with the antenna pointing down or becoming horizontal with the antenna to the side.

SUMMARY OF THE INVENTION

The present invention is an attachment assembly for a portable radio (or other portable electronic device). The attachment assembly allows the electronic device to be attached to a person's belt and locked into a vertical position, thus preventing rotation while the electronic device is on the person's belt. The attachment assembly employs a "soft" lock, so that if the radio is forced to rotate, the attachment assembly will not break.

The locking belt attachment assembly is comprised of two pieces: belt clip and a cleat. The cleat is attached to the electronic device or a portion thereof. Alternatively, the cleat may be formed as part of the electronic device or a portion thereof. An attachment post on the cleat is selectively insertable into a slot on a clip member such that during insertion, the cleat cannot rotate, but once the attachment post is fully inserted into the slot, the cleat is rotatable. To couple the cleat to the clip member, the electronic device is rotated 90 degrees relative to the clip member to a horizontal position, positioning the attachment post in an insertion position relative to the slot. The attachment post is then inserted into the slot. Once the attachment post is fully inserted into the slot, the electronic device is rotated back 90 degrees to a vertical position and a snap lock feature on the belt clip interfaces with a snap lock mating feature on the cleat, locking the electronic device into its vertical position. To remove the electronic device, a rotating force is applied to the electronic device that disengages the snap lock feature and rotates the electronic device 90 degrees to the horizontal position. Next the attachment post is removed from the slot, again releasing the cleat from the belt clip.

BRIEF DESCRIPTION OF THE DRAWINGS

The above and other aspects, features and advantages of the present invention will be more apparent from the following more particular description thereof, presented in conjunction with the following drawings wherein.

Below is a list of reference numbers associated with the figures.

| No. | Component |
| --- | --- |
| 10 | Locking Belt attachment assembly |
| 12 | Belt Clip |
| 14 | Cleat |
| 16 | Bump(s) |
| 18 | Attachment Area |
| 20 | Slot |
| 22 | Slot V-wall |
| 24 | Slot V-wall |
| 26 | Slot Side Wall |
| 28 | Slot Side Wall |
| 30 | Slot Side Flange |
| 32 | Slot Side Flange |
| 34 | Slot bottom Walls |
| 36 | Slot U-shaped Flange |
| 38 | Cavity |
| 40 | Finger Spring |
| 42 | Snap Lock Feature |
| 44 | Base Portion - Cleat |
| 46 | Attachment Post - Cleat |
| 48 | Locking Disk - Cleat |
| 50 | Parallel Side |
| 51 | Parallel Side |
| 52 | Diameter - Locking Disk |
| 54 | Snap Lock Receiving Feature - Cleat |
| 56 | Belt Opening |
| 58 | Side Groove |
| 60 | Side Groove |
| 62 | Snap Feature |
| 64 | Wings - Cleat |
| 70 | Bump Stop |
| 72 | Front Surface |
| 74 | Rear Surface |

-continued

| No. | Component |
|---|---|
| 100 | Electronic Device |
| 102 | Recess |
| 104 | Wing Slots |
| 106 | Snap Feature Receiver |

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

In current quick-release-type belt attachment devices for portable electronic devices, the electronic device is free to rotate or swivel once it is connected to the belt attachment device. This rotation can be annoying and uncomfortable to the user. The present embodiment allows the user to lock an electronic device into a vertical position, thus preventing rotation of the electronic device while the electronic device is on the user's belt. A locking approach employed is a "soft" lock, meaning that if the electronic device is forced to rotate, a locking mechanism will release, but rotation will not result above a predetermined minimum force.

The present embodiment is a belt attachment assembly for an electronic device, such as a portable radio. The attachment assembly allows the electronic device to be attached to, for example, a person's belt, and locks the electronic device from swiveling after the electronic device is in a predefined position (vertical position). This predefined position (or locked position) is not fixed or permanent, but rather is a "soft" lock position. Thus, the present embodiment is referred to herein as a "soft" lock device such that when a predetermined minimum force, and more specifically, a predetermined minimum rotational force (or moment), is applied to the electronic device, the electronic device will "unlock" and swivel in the attachment electronic device assembly.

Figure 1:
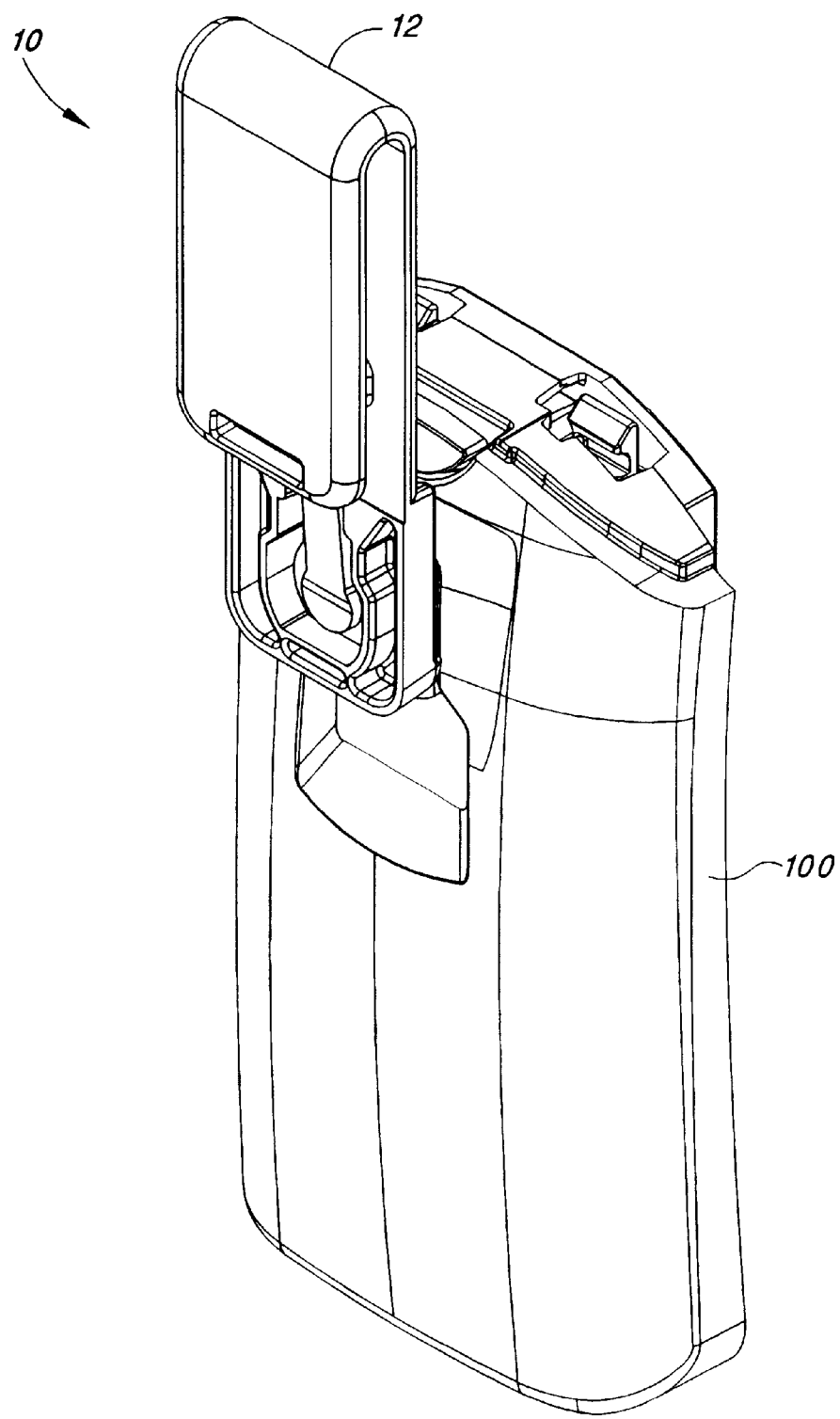
FIG. 1 is an isometric view of an attachment assembly of one embodiment of the present invention attached to a radio battery.
Figure 2:
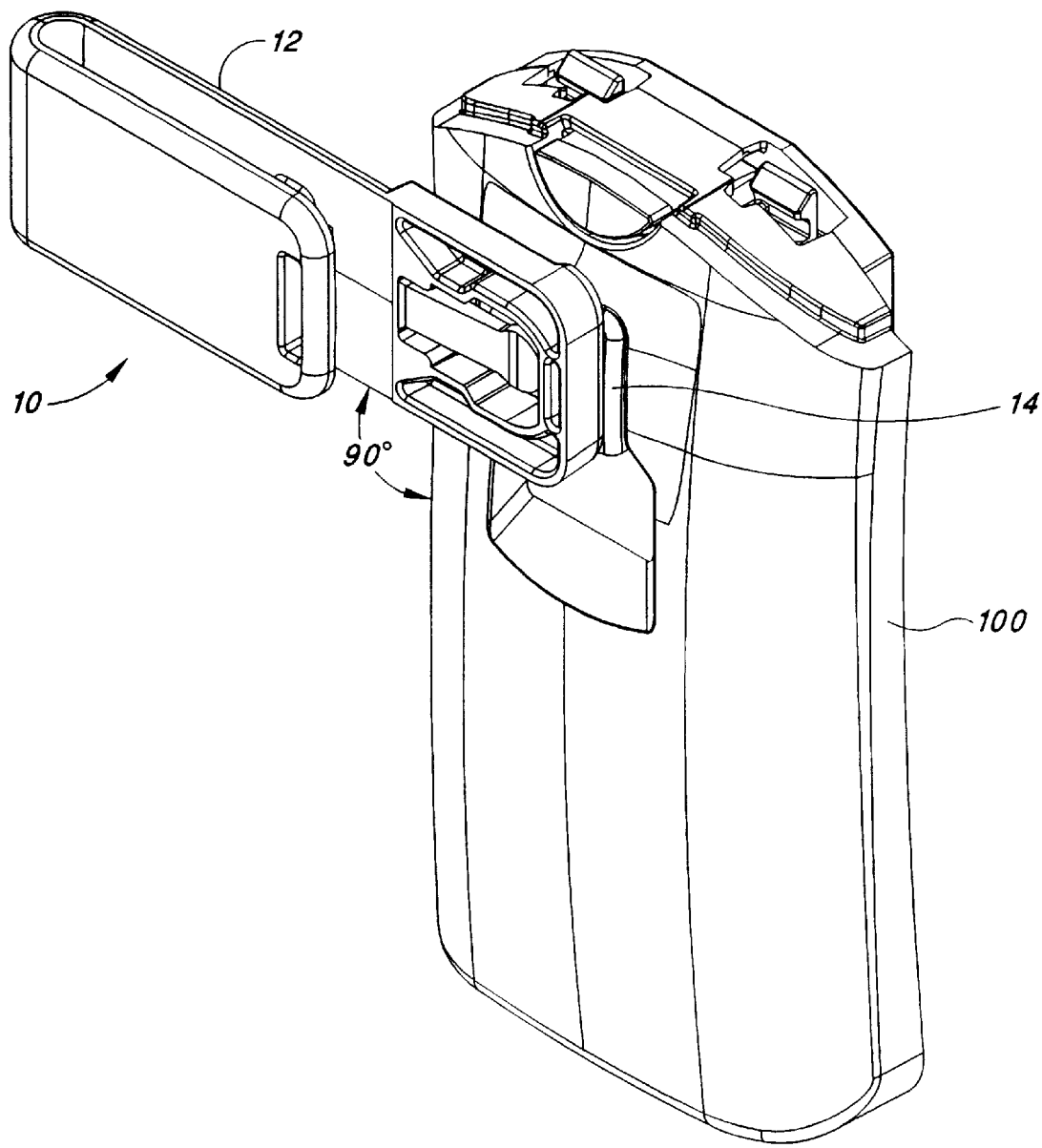
FIG. 2 is an isometric view of the attachment assembly of FIG. 1 attached to the radio battery and rotated 90 degrees.

FIGS. 1 and 2 show an isometric view of the present embodiment The attachment assembly 10 that is shown to an electronic device 100, in this case a radio battery. The attachment assembly 10 is comprised of two pieces: a belt clip 12 and a cleat 14. The cleat 14 is attached to the electronic device 100 (shown in FIG. 3). Once attached to the electronic device 100, the cleat 14 is then placed into the belt clip 12 by rotating the cleat 14 and the electronic device 100 90 degrees in relation to the belt clip 12. An attachment post 46 on the cleat 14 is then inserted into a slot 20 on the belt clip 12. Once the attachment post 46 is fully inserted into the slot 20 (shown in FIG. 2), the electronic device 100 is rotated back 90 degrees to a vertical position (FIG. 1) and a snap lock feature 42 on the belt clip 12 interfaces with a snap lock mating feature 54 on the cleat 14, locking the electronic device 100 into the vertical position. To remove the electronic device 100, a rotating force is applied that disengages the snap lock feature 42 and the electronic device 100 is rotated 90 degrees relative to the belt clip 12 (to a horizontal position). The attachment post 46 is then removed from the slot 20, releasing the cleat 14 from the belt clip 12.

Figure 4:
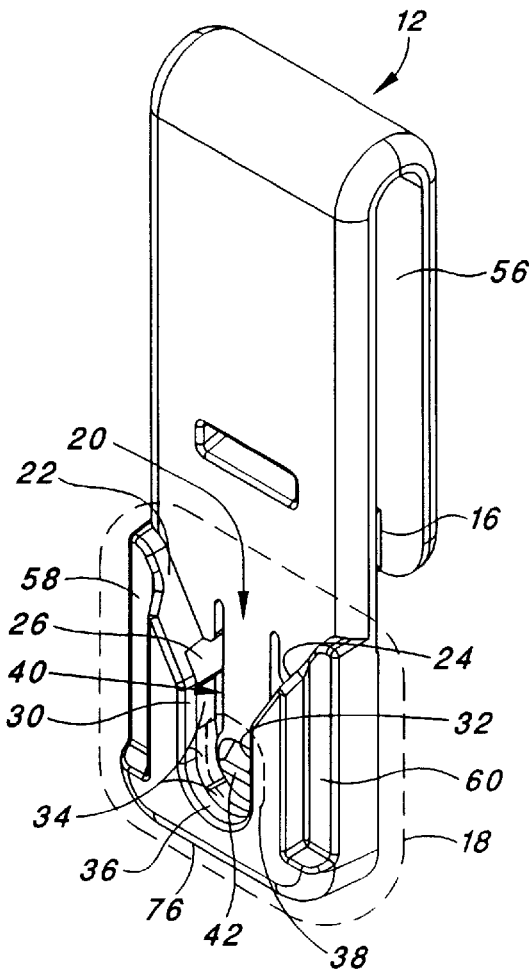
FIG. 4 is an isometric front view showing details of a belt clip, the attachment assembly of FIG. 1.
Figure 5:
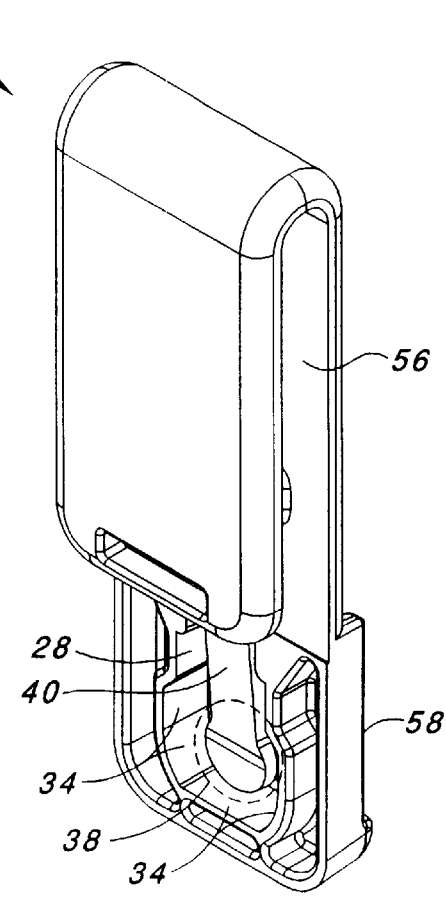
FIG. 5 is an isometric rear view showing details of the belt clip of FIG. 4.

FIGS. 4 and 5 show more detail of the belt clip 12, which is generally an inverted "J" shape creating a belt opening 56 that can be slipped over a belt or waist band of pants worn by the user. Located in the interior of the belt opening 56 is a bump 16 or series of bumps that provide a frictional force to the belt when the belt clip 12 is positioned on the belt. The frictional force is sufficient to aid in the retention of the belt clip 12 on the belt but just small enough to still allow removal when desired by the user. The belt clip 12 can be made from a variety of materials that are lightweight and durable such as metal or plastic with the preferred material being Lexan.

On a lower portion of the belt clip 12 is an attachment area 18 that is designed to insertably receive and lock the cleat 14 in place. The attachment area 18 has a vertical center opening slot 20 defined by v-shaped top opening walls 22 and 24 transitioning into vertical opposing side walls 26, 28 with corresponding center facing side flanges 30 and 32. The side walls 26 and 28 terminate into a cavity 38 defined by closed bottom walls 34. The flanges 30 and 32 terminate to provide a unshaped flange 36. The dimension between the side walls 26 and 28 is greater than the dimension between the side flanges 30 and 32. An integral finger spring 40 is centered in the slot 20. The finger spring 40 is attached near a top of the slot 20 and a free end is positioned near a center of the cavity 38, with the free end having a snap lock feature 42 protruding forward into the cavity 38 from the spring 40. Along vertical outside edges of the attachment area 18 are a pair of grooves 58 and 60.

Figure 6:
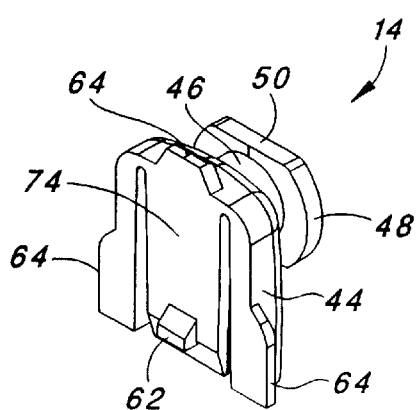
FIG. 6 is an isometric rear view showing details of the cleat of FIG. 3
Figure 7:
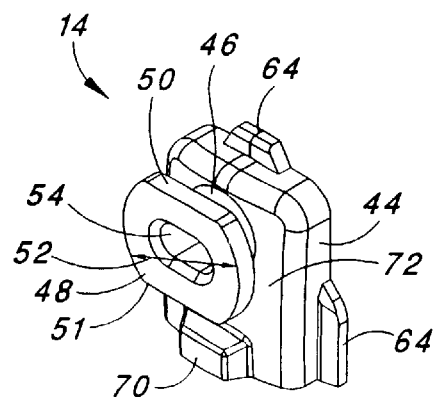
FIG. 7 is an isometric front view showing details of the cleat of FIGS. 3 and 6.

FIGS. 6 and 7 show details of the cleat 14 including a base portion 44 with a front surface 72 and rear surface 74. The rear surface 74 attaches to the electronic device 100. The cleat 14 can be made from a variety of materials that are lightweight and durable such as metal or plastic with the preferred material being Lexan. Extending perpendicular to the front surface 72 of the base 44, near a top end, is an attachment post 46. The attachment post 46 is cylindrical in shape with a diameter dimensioned to be insertably receivable within the side flanges 30 and 32 and the u-shaped flange 36.

A locking disk 48 is located at an end of the post 46, opposite the base portion 44. The locking disk 48 is parallel to the front surface 72 and is generally obround in shape with horizontal parallel sides 50 and 51 and a diameter 52. The diameter 52 is dimensioned larger than a distance between the parallel sides 50 and 51. (Another way to describe the shape of the locking disk 48 is it is a circular disk intersected by two horizontal parallel surfaces 50 and 51, with segments of the circular disk above and below the surfaces 50 and 51 removed). The thickness of the locking disk is dimensioned to slide between the flanges (30,32 and 36) and the finger spring 40 while the distance between the parallel sides 50 and 51 are dimensioned to be insertably receivable between the side walls 26 and 28. The diameter 52 of the circular disk is dimensioned to fit rotatably within the cavity 38 defined by the closed bottom walls 34. When the parallel sides 50 and 51 of the locking disk 48 are positioned between the side walls 26 and 28 of the belt clip 12, the cleat 14 cannot rotate significantly. It is after the cleat 14 reaches the bottom of the slot 20 (when the attachment post 46 makes contact with the U-shaped flange 36) that the diameter 52 of the locking disk 48 can rotate freely inside the cavity 38. Since the flanges 30, 32 and 36 are dimensioned smaller than the locking disk diameter 52, they prevent the locking disk 48 from falling out of the slot 20. At the center of the locking disk 48 is a snap lock receiving feature 54 that is a recess, generally obround in shape, and dimensioned to receive the snap lock feature 42.

Protruding from the front surface 72, near the lower end, is a bump stop 70. The bump stop 70 is generally rightprism-shaped and dimensioned to fit in and slide along the grooves 58 and 60. The bump stop 70 assists in locking the cleat 14 in the belt clip 12 such that when the snap lock feature 42 is engaged with the snap lock receiving feature 54 of the locking disk 48, the bump stop 70 is resting against the bottom surface 76 of the attachment area 18, preventing rotation of the cleat 14.

Figure 3:
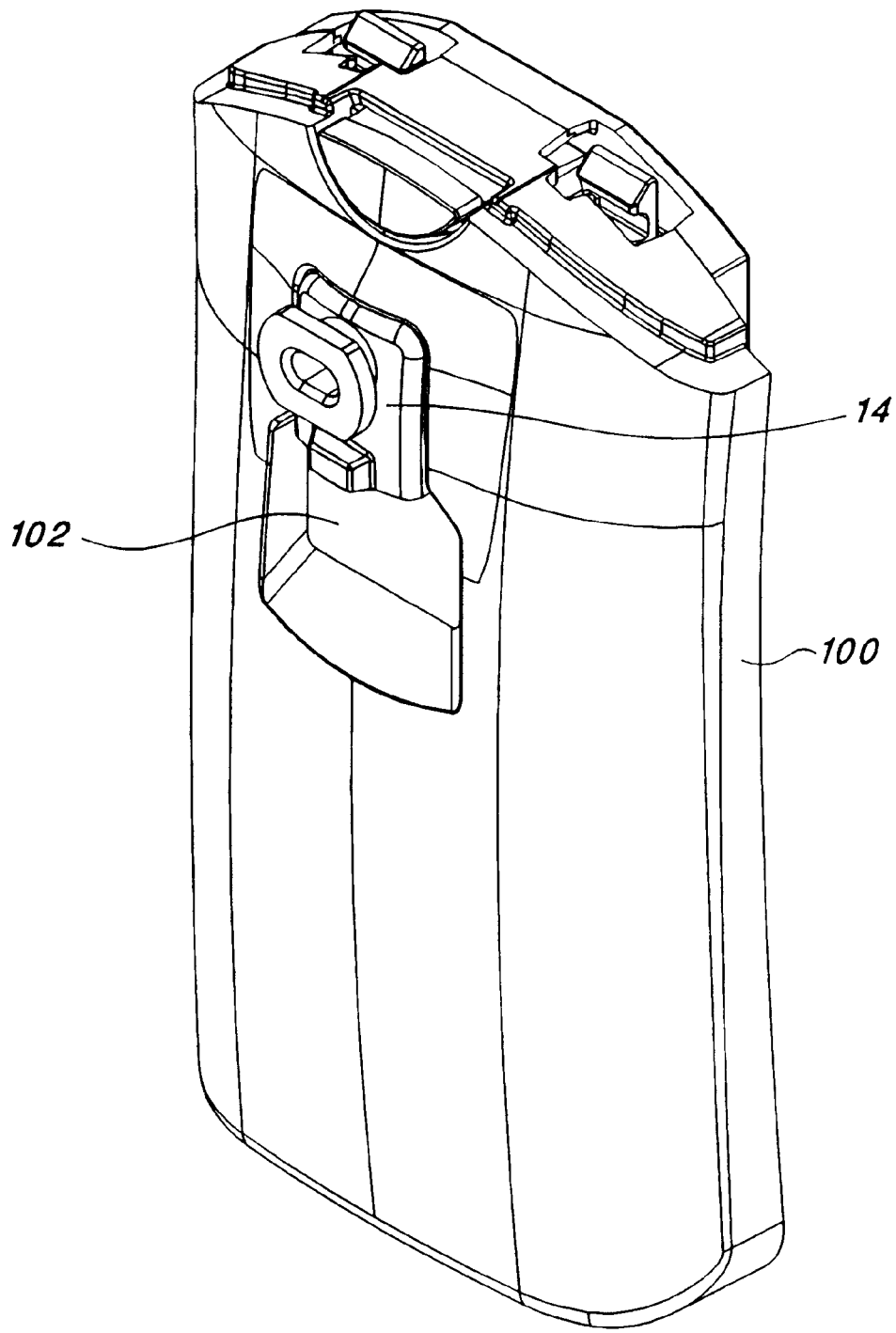
FIG. 3 is an isometric view of a cleat of the attachment assembly of FIG. 1 attached to the radio battery.
Figure 8:
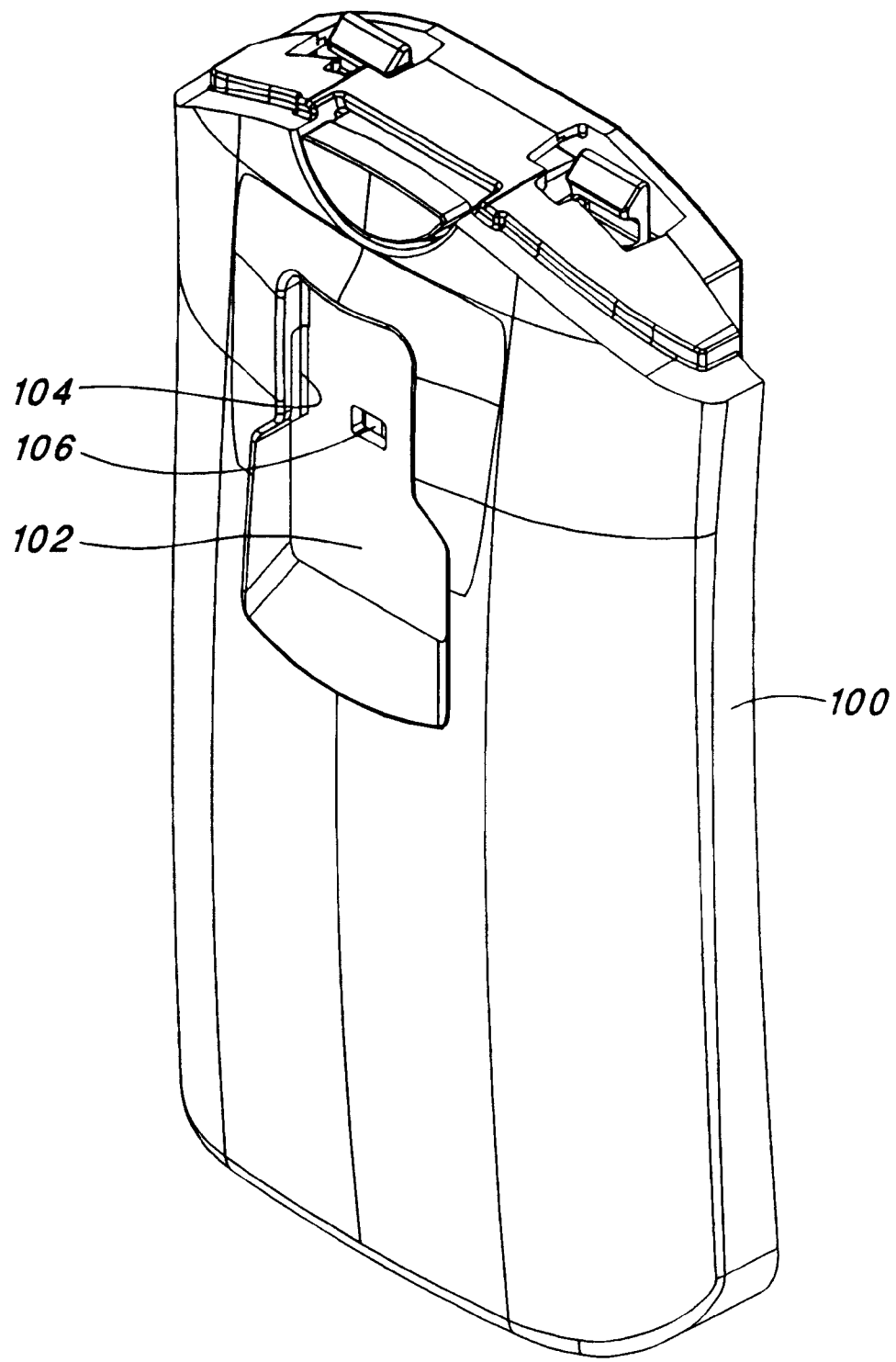
FIG. 8 is an isometric view of the radio battery of FIGS. 1, 2 and 3 with the cleat removed.

There are various methods of attaching the cleat 14 to the electronic device 100. One method of attaching the cleat 14 to the electronic device 100 includes a recess 102 in the electronic device 100 that is dimensioned to slidably receive and retain the cleat 14. FIG. 8 shows the rear of the electronic device 100 with the recess 102 therein. Along the side and top of the recess 102 are slots 104. The slots 104 are dimensioned to receive a set of flat wings 64 extending out from the vertical edges and the top edge of the rear surface 74 of the base 44 (shown in FIGS. 6 and 7). The cleat 14 is held in the recess 102 by a simple snap feature 62 (shown in FIGS. 6 and 7) that engages a snap feature receiver 106 in the recess 102. FIG. 3 shows the cleat 14 locked in place on the electronic device 100. Alternatively, the cleat 14 may be formed as part of the electronic device 100 or attached to the electronic device 100 using adhesives or fasteners (such as rivets or screws).

In use, the belt clip 12 is attached to a waist belt in some manner. The cleat 14 is attached to the electronic device 100 (as shown in FIG. 3). The electronic device 100 is rotated to a 90 degree angle (as shown in FIG. 2) with the attachment post 46 positioned above the slot 20. The v-walls 22 and 24 help guide the attachment post 46 into the slot 20, with the parallel sides 50 and 51 lining up with the side walls 26 and 28 and the bump stop 70 lining up with one of the grooves 58 or 60. As the cleat 14 is inserted into the belt clip 12, the locking disk 48 comes into contact with the snap lock feature 42, deflecting the finger spring 40 rearwardly and moving the snap lock feature 42 momentarily out of the way. While the parallel sides 50 and 51 are sliding within the side walls 26 and 28 and the bump stop 70 is sliding within the groove 58 or 60, the cleat 14 is prevented from rotating and the electronic device 100 stays in a 90 degree position (horizontal position). When the cleat 14 is fully engaged in the belt clip 12, the attachment post 46 is in contact with the unshaped flange 36. At this point, the diameter 52 of the locking disk 48 is positioned within the cavity 38 and the cleat 14 can now rotate. As the cleat 14 is rotated to a vertical position, the snap lock receiving feature 54 of the locking disk 48 lines up with the snap lock feature 42 and the finger spring 40 forces the snap lock feature 42 into the snap lock receiving feature 54, locking the cleat 14 and the electronic device 100 in the vertical position. At the same time as the cleat 14 is rotating to the vertical position, the bump stop 70 moves from the groove 58 or 60 and rotates until it makes contact with the lower surface 76 of the attachment area 18, helping lock the battery 100 in a vertical position.

While the invention herein disclosed has been described by means of specific embodiments and applications thereof, numerous modifications and variations could be made thereto by those skilled in the art without departing from the scope of the invention set forth in the claims. One example is the clip may be attached to the waist belt and the cleat attached to the electronic device.

What is claimed is:

1. A rotating and locking clip for an electronic device attachment comprising:
   a cleat including a base with a front side and a rear side; and
   a clip including an attachment area adapted for mating with the cleat, and a locking structure adapted for locking the cleat and clip, wherein the locking structure adapted for locking the cleat and clip comprises:
   the clip having an attachment area with a center vertical slot that is open at the top and closed at the bottom with vertical side walls having internally facing flanges terminating into a u-flange, an integral finger spring extending down the center of the slot with the attached end near the open end of the slot and a free end centered near the closed end of the slot having a locking structure; and
   an attachment post extending perpendicular from the front side of the cleat near a top end being dimensioned to be insertably received between the flanges of the slot, the attachment post having a locking disk shaped to be selectively inserted between the vertical sidewalls of the slot such that during insertion the side walls prevent the locking disk from rotating but once fully inserted the locking disk can rotate, the locking disk having a locking receiver that can be releasably engaged with the locking structure of the clip such that when the locking structure and locking receiver are engaged, the cleat is locked in a predefined position in relation to the clip.

2. The apparatus of claim 1 wherein the cleat being adapted for attachment to an electronic device.

3. The apparatus of claim 2 wherein the attachment comprises the rear side of the cleat having an attachment mechanism to the electronic device.

4. The apparatus of claim 3 wherein the attachment mechanism comprises an adhesive securely bonding the rear side of the cleat to the electronic device.

5. The apparatus of claim 3 wherein the attachment mechanism comprises fastening the cleat to the electronic device with screws.

6. The apparatus of claim 1 wherein the clip is adapted for attachment to an electronic device.

7. The apparatus of claim 6 wherein the attachment comprises an adhesive securely bonding the clip to the electronic device.

8. The apparatus of claim 1 wherein the cleat is adapted for releasable attachment to a person's waist belt.

9. The apparatus of claim 1 wherein the clip is adapted for releasable attachment to a person's waist belt.

10. The apparatus of claim 9 wherein the releasable attachment comprises a portion of the clip formed in a generally inverted "J" shape creating a belt opening that can be slipped over a persons waist belt.

11. The apparatus of claim 10 wherein the belt opening further includes friction bumps to assist the belt clip retention to the waist belt.

12. The apparatus of claim 1 further comprising:
   the clip having vertical grooves along both outside front edges of the attachment area;
   a bump stop extending perpendicular from the front surface of the base near a bottom end, the bump stop being dimensioned to slidably fit into grooves along the vertical side of the attachment area of the clip, the bump stop being spaced a distance from the attachment post such that while the attachment post is selectively inserted into the slot the bump stop slides along one of the vertical grooves of the belt clip and once the attachment post is fully inserted into the slot and the cleat is rotated, the bump stop rotates out of the groove until the cleat is fully rotated in the vertical position, then the bump stop engages a lower side of the attachment area, assisting the locking structure in the prevention of rotation of the cleat.

13. A rotating and locking clip for electronic device attachments comprising:

a cleat including a base with a front side and a rear side; and a clip including an attachment area adapted for mating with the cleat, and a locking structure adapted for locking the cleat and clip, and wherein the cleat includes an attachment mechanism for attachment to an electronic device, the attachment mechanism comprising:

wing like protrusions formed around top and side edges on the rear side of the cleat;

a locking means located in the rear side of the cleat; and a recess with wing receiving slots on the electronic device, the recess being dimensioned to slidably receive the cleat with a locking receiver structure whereby as the cleat is inserted into the recess the wings are received into the wing receiving slots and once the cleat is fully inserted, the locking means mates with the locking receiver means securing the cleat to the electronic device.

* * * * *